Patented Apr. 8, 1924.

1,489,991

UNITED STATES PATENT OFFICE.

HENRY V. DUNHAM, OF MOUNT VERNON, NEW YORK.

JOINING WOODEN PIECES AND CEMENT THEREFOR.

No Drawing.  Application filed April 9, 1921. Serial No. 460,033.

*To all whom it may concern:*

Be it known that I, HENRY V. DUNHAM, a citizen of the United States, residing at Mount Vernon, in the county of Westchester and State of New York, have invented certain new and useful Improvements in Joining Wooden Pieces and Cement Therefor, of which the following is a specification.

The present invention relates to joining wood or wooden articles, such as wooden veneers and the like, by means of a novel adhesive.

Various adhesives have heretofore been employed in gluing wood such as veneers, and most of the adhesives so employed have been open to certain objections. Adhesives containing sodium silicate have been proposed, but so far as I know most of these have not given very satisfactory results when used in joining wooden veneers, the greatest objection being that the wooden veneers do not remain firmly joined together, but after a time they tend to separate, especially where they are subjected to alternating excessive wetting and drying. When the sodium silicate adhesives have heretofore been employed, in most cases they eventually reduce themselves to coarse or fine powders which do not have any good adhesive properties.

I have found after many trials, that sodium silicate solution or ordinary water-glass can form the basis of a very satisfactory adhesive for wood, including veneers, if the same is first mixed with a very fine fibrous asbestos. The asbestos which has given very satisfactory results is almost in the condition of a powder, but upon examination it will be seen to consist essentially of very fine fibers. An amount of this asbestos equal to from 2 to 7 per cent, has been found to be especially suitable, when mixed with ordinary grades of water-glass. The different grades of water-glass can be used, and I have secured very good results with what is known commercially as "N-grade," this containing 8.9 per cent of $Na_2O$ and 29 per cent of $SiO_2$, the remainder being water. The "U-grade." can also be used. This contains 13.7 per cent of $Na_2O$ and 32.9 per cent of $SiO_2$, the remainder being water. However, I do not restrict myself to either one of these two grades of water-glass.

It is furthermore advisable, although not essentially necessary, to add to the mixture something which will give increased tackiness to the product. As examples of such materials I mention glucose, dextrin, molasses, rosin size. Any other suitable adhesive can also be added if desired.

As example of mixed adhesives, I will state that a mixture of 7½ parts of dextrin, 10 parts of water and 15 parts of molasses can be added to 250 parts of water-glass containing 5 per cent of asbestos of the character above specified. Another example consists in adding to 250 parts of water-glass of the U-grade above specified, 8 parts of fine asbestos, and 20 parts of rosin size. The rosin size is preferably first moistened with a small quantity of water or molasses, say 20 parts of molasses.

250 parts of water-glass, N-grade, added to 10 parts of asbestos and thoroughly incorporated, and there are then added 20 parts of molasses. Another example—10 grams of dry gelatine, previously softened up with water, were added instead of the molasses.

Another example which has given good results is 500 parts of the silicate solution, 10 parts of asbestos, these being thoroughly incorporated. and to the mixture was added a mixture of 15 parts of tapioca dextrin (cold water soluble) mixed with 10 parts of water.

In most of the examples above specified, I have used small amounts of asbestos, something less than 2 per cent of asbestos can, under some conditions, be employed, even as low as 1 per cent being in some cases, suitable. In other cases 4 or 5 per cent, or up to about 7 per cent of the asbestos can be employed. Such large quantities of asbestos tend to give extremely thick mixtures.

The adhesive as above stated is especially for the uniting of wood such as wood veneers and the like. The adhesive is a thick viscous mass, rather thicker than ordinary molasses, approaching a semi-jelly-like and colloidal mass, when containing about 2 per cent of the asbestos. This adhesive is applied in the ordinary way, by a brush, or preferably by a roller, to one thickness of the wood veneer, and another thickness is laid thereupon with the grain running approximately perpendicular to the grain of the first piece and then high pressure is applied to squeeze the two sheets together as tightly as possible. It is preferable to use a hydraulic or some other press which will give very strong pressure upon the wood.

The wooden articles are then allowed to dry and are ready for use for any desired purpose. It is, of course, to be understood that as many thicknesses of wood can be employed as are necessary to produce the desired product and veneer can also be attached to thick pieces of wood such as boards, table tops and the like, either one or more thicknesses of veneer being so applied.

I make no claim in this application to the adhesive, except where the same is used in connection with a wooden article.

While in most of the examples I have specified other materials to be added to the mixture of silicate solution and asbestos, these two can be used without any other additions, if desired. The mixture of these two is a non-settling, substantially colloidal mixture, very much more viscous than the water-glass used. Obviously, "potash water-glass" can be substituted for sodium compound.

I claim:

1. A process of joining wooden pieces which comprises applying between the same a layer of a viscous fluid comprising as its essential constituents, a dissolved silicate and a very fine fibrous asbestos, and then pressing the wooden pieces together.

2. A cement particularly suitable for joining wooden pieces, the same comprising an alkali silicate solution, and fine fibrous asbestos, the said ingredients being completely mixed to produce a substantially non-settling, thick viscous solution.

3. A cement particularly adapted for joining wooden pieces, the same comprising an alkali silicate solution and fine fibrous asbestos, and another adhesive capable of increasing the tackiness, such ingredients being completely mixed together, forming a thick liquid mass of high viscosity.

4. A cement as covered in claim 2 in which the asbestos amounts to between 2 and 7 per cent of the silicate solution.

In testimony whereof I affix my signature.

HENRY V. DUNHAM.